July 5, 1949.   A. G. STEINMAYER   2,475,341
AERIAL CABLE CUTOUT
Filed March 10, 1947   3 Sheets-Sheet 1
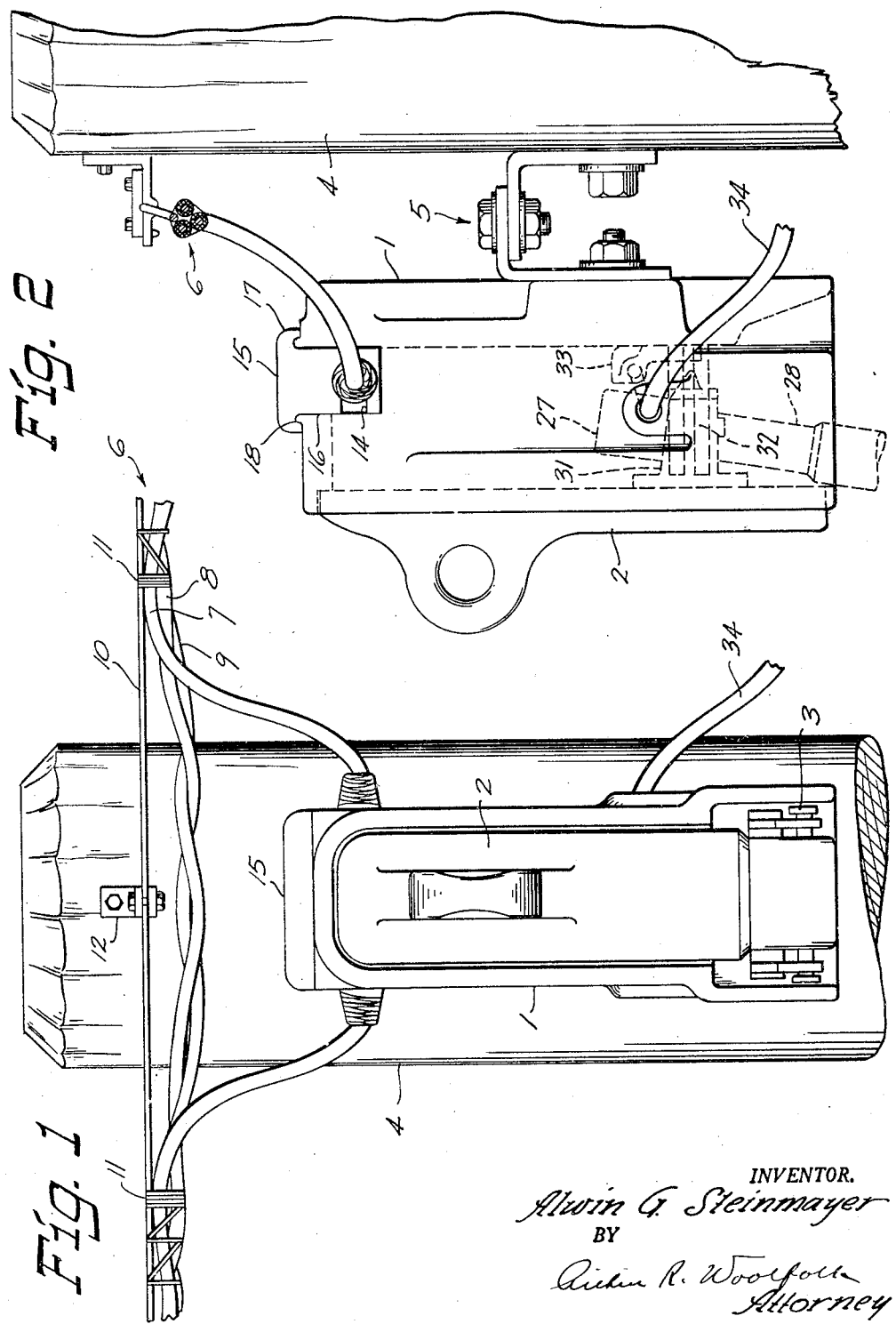
INVENTOR.
Alwin G. Steinmayer
BY
Arthur R. Woolfolk
Attorney July 5, 1949.  A. G. STEINMAYER  2,475,341
AERIAL CABLE CUTOUT
Filed March 10, 1947  3 Sheets-Sheet 2
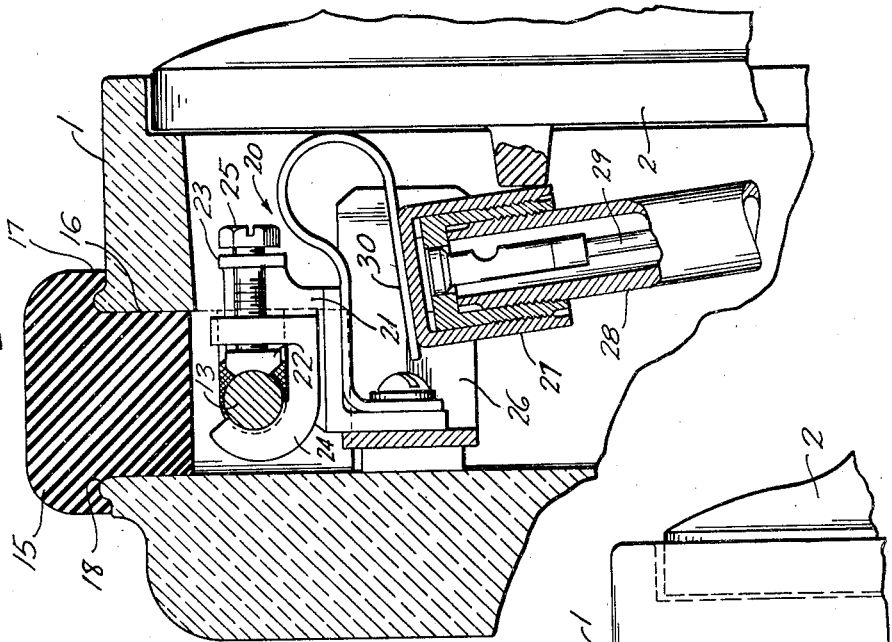
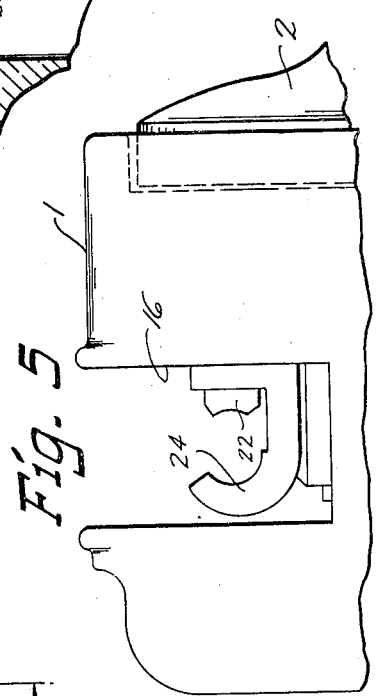
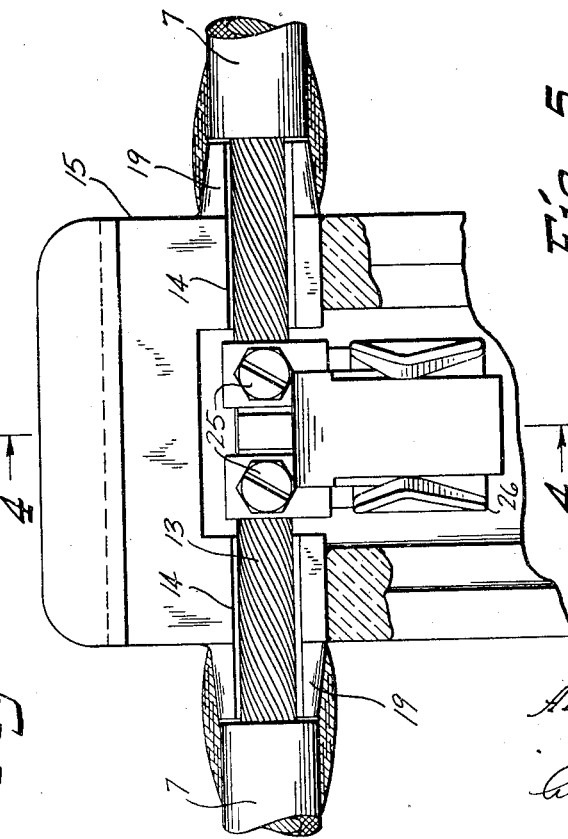
INVENTOR.
Alwin G. Steinmayer
BY
Arthur R. Woofolk
Attorney July 5, 1949.  A. G. STEINMAYER  2,475,341
AERIAL CABLE CUTOUT
Filed March 10, 1947  3 Sheets-Sheet 3
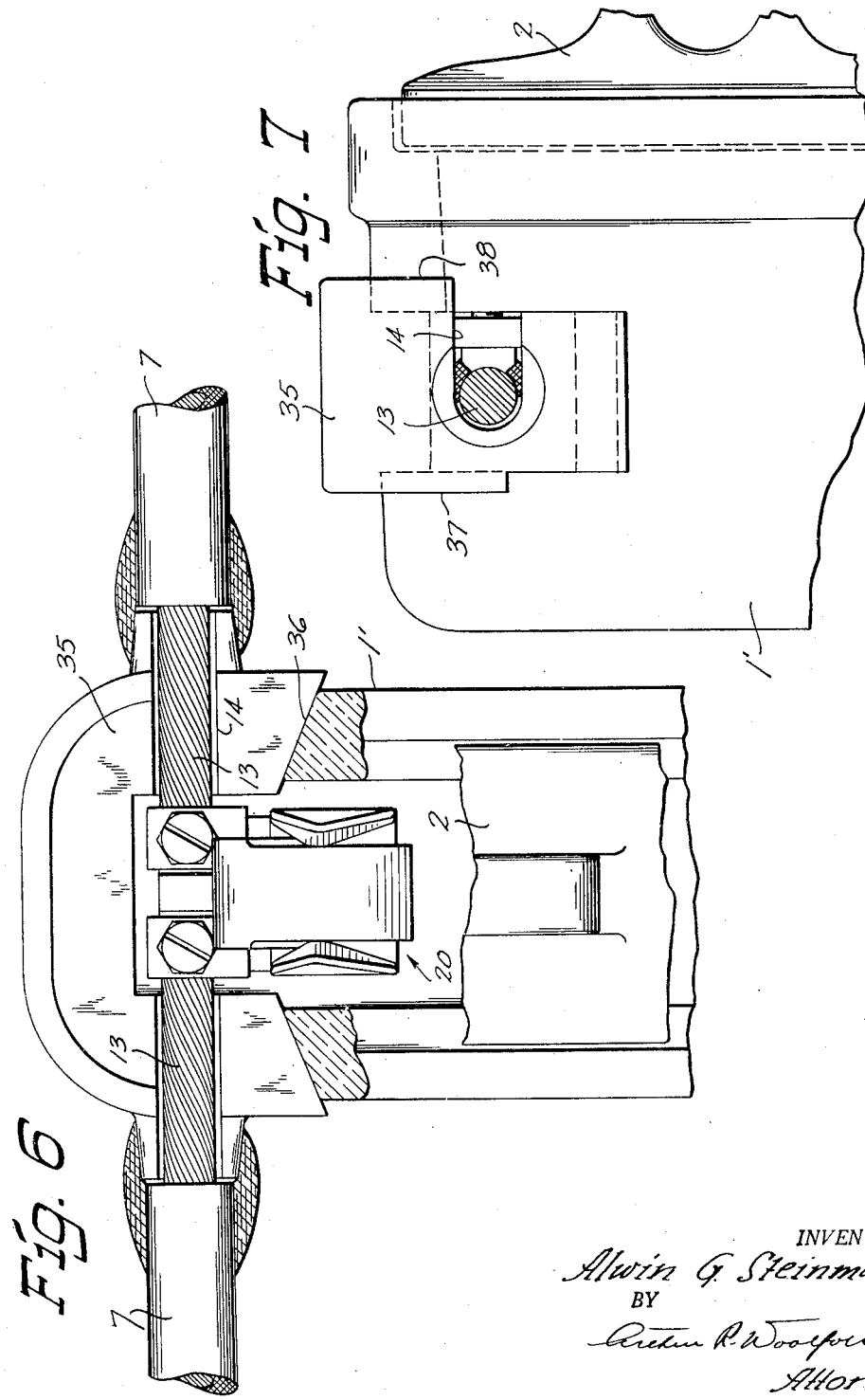
INVENTOR.
Alwin G. Steinmayer
BY
Arthur R. Woolpert
Attorney Patented July 5, 1949

2,475,341

UNITED STATES PATENT OFFICE 2,475,341

AERIAL CABLE CUTOUT

Alwin G. Steinmayer, Milwaukee, Wis., assignor to Line Material Company, Milwaukee, Wis., a corporation of Delaware Application March 10, 1947, Serial No. 733,519

7 Claims. (Cl. 174—59)

This invention relates to cutouts and is particularly directed to a cutout construction for an aerial cable.

The present trend in electrical distribution is towards the use of what is called an aerial cable in which one or more cables are bound together by metal tapes or other means and are supported from a messenger wire so that these cables may be passed through trees without danger and also so that they will occupy a smaller amount of room on the supporting poles. In addition to this, there are, of course, many other advantages which do not concern the present invention. However, it is desirable at times to tap a single cable and to install a cutout for that cable. Heretofore it has been necessary to use a considerable amount of additional equipment in order to accomplish the above.

This invention is designed to provide a cutout construction which is particularly suited for use with an aerial cable and which is so made that it is not necessary to cut the cable at all but merely requires the stripping of a small portion of the insulation from the cable and the clamping of the exposed portion of the cable directly to one of the terminals of the cutout structure, the stripped portion being fully housed and protected from the weather.

In greater detail, further objects of this invention are to provide a cutout construction for an aerial cable which is so made that the cable is arranged to be passed through slots in a plug-like member or closure member which is bodily inserted together with the cable into the housing of the cutout and which completes or closes the corresponding portion of the housing, and in which means are provided through the front of the housing for giving access to clamping means for clamping the unbroken cable to the upper terminal of the cutout, such clamping serving effectively to lock both the auxiliary member or plug and the cable in place.

Further objects are to provide means in the form of an auxiliary plug having relatively short slots for the reception of the cable and having projecting sleeve-like portions which are adapted to be taped to the cable so that when the plug-like member is in place and the cable locked to the upper terminal of the cutout, there is very little exposure of the remaining portion of the slots, thus preventing the entrance of birds into the housing and also discouraging the entry of insects into the housing at this portion of the structure.

Further objects are to provide an aerial cable cutout which is of simple construction, which is very easy to install, and which provides access not only to the cutout itself but also to the clamping means for the stripped portion of the cable.

Embodiments of the invention are shown in the accompanying drawings, in which:

Figure 1 is a front view of the cutout and the adjacent portion of the cable showing them attached to a pole.

Figure 2 is a side elevation of the structure shown in Figure 1.

Figure 3 is an enlarged view partly in section with parts broken away of the upper portion of the cutout.

Figure 4 is a sectional view on the line 4—4 of Figure 3.

Figure 5 is a side view of the upper portion of the cutout with the plug and cable removed.

Figure 6 is a view corresponding to Figure 4 showing a further form of the invention.

Figure 7 is a side elevation of the upper portion of the structure shown in Figure 6, with taping omitted on the near side of the figure for the sake of clearness.

Referring to the drawings, particularly Figures 1 through 5, it will be seen that the cutout comprises a housing 1 of porcelain or other suitable insulating material provided with a door 2 of insulating material hingedly mounted as indicated at 3 in any suitable manner as, for instance, shown in the United States patent to William O. Schultz, No. Re. 22,372 of September 7, 1943 for a Fuse. The housing is supported from the pole 4 in any suitable manner as by means of the bracket structure indicated generally at 5.

An aerial cable is indicated generally at 6 and may comprise a plurality of cables 7, 8, and 9 which are supported from a messenger wire 10 by means of metal tapes 11. The cables 7, 8, and 9 are twisted or otherwise secured together and the messenger wire 10 is supported by means of a bracket 12 secured to the pole. When it is desired to tap one of the cables, such cable is untwisted or looped downwardly from the remaining cables, as shown in Figure 1, and a portion thereof has the insulation removed to thereby provide a bared portion 13, see Figure 3. This bared portion of the cable is received in slots 14 extending inwardly from either the front or the rear side of a plug-like member 15 formed of insulating material. This plug-like member 15 is generally of rectangular construction with downwardly projecting legs provided with the slots 14 and is adapted to be moved downwardly into the slotted portion 16 of the housing 1, as shown most clearly in section in Figure 4. The plug-like member or auxiliary closure member 15 may be provided with overhanging lips 17 which are grooved and receive upstanding baffles or ridge-like portions 18 formed integrally with the body portion of the housing 1, to thus prevent the entrance of water from the top of the housing.

It is to be noted from reference to Figure 3 that the plug-like member 15 is provided with projecting sleeve-like portions 19 which also have continuations of the slots 14 formed therein. These sleeve-like portions 19 are tapered outwardly and are adapted to be taped to the cable 7 as shown in Figure 3. This taping also serves to close a portion of the slots 14.

It is to be noted that the slots 14 are short and consequently there is no chance of birds entering the housing 1 through these slots and their small size greatly discourages the entrance of insects at this portion of the apparatus.

The cutout construction is provided with an upper terminal assembly indicated generally at 20, see particularly Figure 4, which includes a conducting member 21 having integrally formed cable contacting portions 22 and guiding lips 23. C-clamps 24 are arranged to clamp the bared portion 13 of the cable to the portions 22, as shown in Figure 4, and the screws 25 of the C-clamps pass loosely through the guiding portions 23 and are threaded into the body of the C-clamps and bear against the cable contact portions 22 of the upper terminal assembly. This upper terminal assembly is also provided with a pair of spring lips 26 which receive between them the cap or upper terminal 27 of the drop-out fuse construction, which may, in turn, comprise a fuse tube 28, the cap 27 previously described and a fuse link indicated generally at 29, the fuse link normally serving to restrain the fuse tube against drop-out motion as described in detail in the above noted patent to William O. Schultz. The upper terminal assembly may also comprise a spring finger or contact portion 30 which bears against the upper terminal 27 of the drop-out fuse tube. The fuse tube 28 is slidably carried in a lower terminal member 31, see Figure 2, which, in turn, is carried by the door 2. The lower terminal 31 on the door is engaged by spring fingers 32 of the lower stationary terminal 33, which latter is secured within the housing 1, as shown in Figure 2, and receives the load conductor 34 as set forth in greater detail in the above noted patent to William O. Schultz. The arrangement is such that when the fuse link 29 is ruptured on overload, the fuse tube 28 is released and drops downwardly, thus moving its upper terminal 27 downwardly away from the upper stationary terminal assembly 20.

It is to be noted particularly that when the parts are in their assembled position that the cable is locked to the upper terminal assembly and thus, in turn, locks the plug 15 against upward motion.

Further it is to be noted from reference to Figure 5 that it is a very simple matter after the cable has been positioned within the slots 14 of the plug 15 to insert the plug directly downwardly into the slot 16 of the housing 1 and to thereafter open the door 2 of the housing to provide access to the screws 25 of the clamping means or C-clamps 24 carried by the upper terminal assembly.

The invention may take other forms; for example, as shown in Figures 6 and 7, the plug 35, though quite similar to the plug 15, is provided with downwardly and outwardly slanting lower faces 36 and the housing 1' has similarly shaped adjacent coacting portions. Also the plug 35 may be provided with side flange-like portions 37 and 38 which may extend down as far as desired on the sides of the housing as shown, for instance, in Figure 7. Also it is possible to omit the baffles or ridge-like portions 18 as shown in the first form of the invention if this is desired.

It is to be distinctly noted that the baffles 18 could be used with either form of the invention and the side flanges 37 and 38 could also be used with either form of the invention.

It will be seen that a novel type of cutout construction particularly suitable for aerial cables has been provided by this invention in which a very simple means is provided for receiving the unbroken cable and for insertion into the upper portion of the housing of the cutout assembly. It will also be noted that when the parts are in their final assembled position not only is the cable locked in place and electrically connected to the upper terminal but the insertable plug-like member is also locked against removal.

While the device has been illustrated and described as used for a single phase tap on a three phase cable, it is clear that three devices could be employed if three phase service is wished for the branch line. Also it is clear that the device could be used for a single cable as well as for a tap on a three phase cable.

Although this invention has been described in considerable detail, it is to be understood that such description is intended as illustrative rather than limiting, as the invention may be variously embodied and is to be interpreted as claimed.

I claim:

1. A housing for a cutout construction arranged to normally electrically connect to an unbroken line conductor comprising an insulating housing having an open front and having an opening in its top wall, a closure member having slots arranged to receive the unbroken line conductor and arranged to be inserted with the unbroken line conductor in the opening in the top wall of the housing, an upper stationary terminal having fastening means for electrically connecting the unbroken line conductor to the upper stationary terminal, said closure member having a cutaway portion to accommodate said fastening means, and a door for the front of said housing.

2. A housing for a cutout construction arranged to normally electrically connect to an unbroken line conductor comprising an insulating housing having an open front and having an opening in its top wall, an insulating closure member having slots arranged to receive the unbroken line conductor and arranged to be inserted with the unbroken line conductor in the opening in the top wall of the housing, an upper stationary terminal having fastening means for electrically connecting the unbroken line conductor to the upper stationary terminal, said closure member having a cutaway portion to accommodate said fastening means, and a door for the front of said housing.

3. A housing for a cutout construction arranged to normally electrically connect to an unbroken line conductor comprising an insulating housing having an open front and having a transversely extending opening in its top wall, a plug-like insulating closure member having outwardly projecting sleeve-like portions and having slots arranged in the sleeve-like portions and in the body of the closure member and arranged to receive the unbroken line conductor, said plug-like member being arranged to be inserted together with the unbroken line conductor in the transverse opening in the top wall of the housing, an upper stationary terminal having fastening means for electrically connecting the unbroken line conductor to the upper stationary terminal, said plug-like closure member having a cutaway portion to accommodate said fastening means, and a door for the front of said housing, said door being arranged to provide access to the fastening means of said upper terminal.

4. A housing for a cutout construction arranged to normally electrically connect to an unbroken line conductor comprising an insulating housing having an open front and having a transversely extending opening in its top wall, a plug-like insulating closure member having outwardly projecting sleeve-like portions and having slots arranged in the sleeve-like portions and in the body of the closure member and arranged to receive the unbroken line conductor, said plug-like member being arranged to be inserted together with the unbroken line conductor in the transverse opening in the top wall of the housing, an upper stationary terminal having fastening means for electrically connecting the unbroken line conductor to the upper stationary terminal, and a door for the front of said housing, said door being arranged to provide access to the fastening means of said upper terminal, said plug-like member interlocking with said unbroken line conductor when said unbroken line conductor is secured to said upper terminal, whereby said plug-like member is locked against withdrawal from said housing.

5. A housing for a cutout construction arranged to normally electrically connect to an unbroken line conductor comprising an insulating housing having an open front and having a transversely extending opening in its top wall, a plug-like insulating closure member having outwardly projecting sleeve-like portions and having slots arranged in the sleeve-like portions and in the body of the closure member and arranged to receive the unbroken line conductor, said plug-like member being arranged to be inserted together with the unbroken line conductor in the transverse opening in the top wall of the housing with the sleeve-like portions projecting outwardly beyond the sides of said housing, an upper stationary terminal having fastening means for electrically connecting the unbroken line conductor to the upper stationary terminal, and a door for the front of said housing, said door being arranged to provide access to the fastening means of said upper terminal, said outwardly projecting sleeve-like members being tapered to approximately the size of said unbroken line conductor and being arranged to receive tape, whereby said sleeve-like members and said unbroken line conductor can be taped together in a uniform and smooth manner.

6. A housing for a cutout construction arranged to normally electrically connect to an unbroken line conductor comprising an insulating housing having an open front and having a transverse slot extending through its top and side walls and extending from one side wall directly across said housing to the other side wall, an insulating closure member having outwardly opening slots arranged to receive the unbroken line conductor and arranged to be inserted together with the unbroken line conductor in the slot in said housing, an upper stationary terminal having fastening means for electrically connecting the unbroken line conductor to the upper stationary terminal, said insulating closure member interlocking with said unbroken line conductor when said unbroken line conductor is connected to said upper terminal whereby said insulating closure member is locked against withdrawal from said housing, and a door for the front of said housing.

7. A housing for a cutout construction arranged to normally electrically connect to an unbroken line conductor comprising an insulating housing having an open front and having a transverse slot extending through its top and side walls and extending from one side wall directly across said housing to the other side wall, an insulating closure member having outwardly opening slots arranged to receive the unbroken line conductor and arranged to be inserted together with the unbroken line conductor in the slot in said housing, an upper stationary terminal having fastening means for electrically connecting the unbroken line conductor to the upper stationary terminal, said closure member having a centrally located cutaway portion to accommodate said fastening means, and a door for the front of said housing arranged to provide access to said fastening means.

ALWIN G. STEINMAYER.

REFERENCES CITED

The following references are of record in the file of this patent:

UNITED STATES PATENTS

| Number | Name | Date |
|---|---|---|
| 830,585 | Graves et al. | Sept. 11, 1906 |
| Re. 22,372 | Schultz | Sept. 7, 1943 |
| 2,114,745 | McCluskey et al. | Apr. 19, 1938 |
| 2,281,515 | Ruggieri | Apr. 28, 1942 |